Dec. 14, 1926.
M. E. REAGAN
1,610,590
AUTOMATIC CIRCUIT INTERRUPTER
Filed March 24, 1921
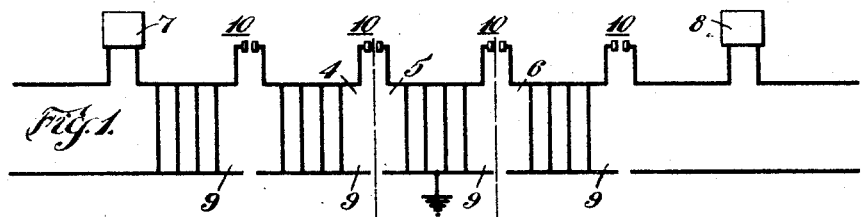
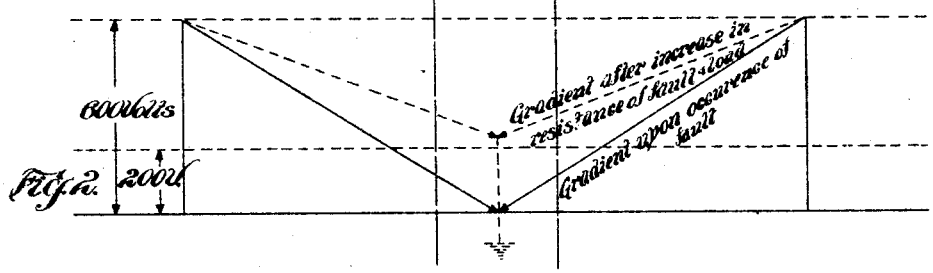
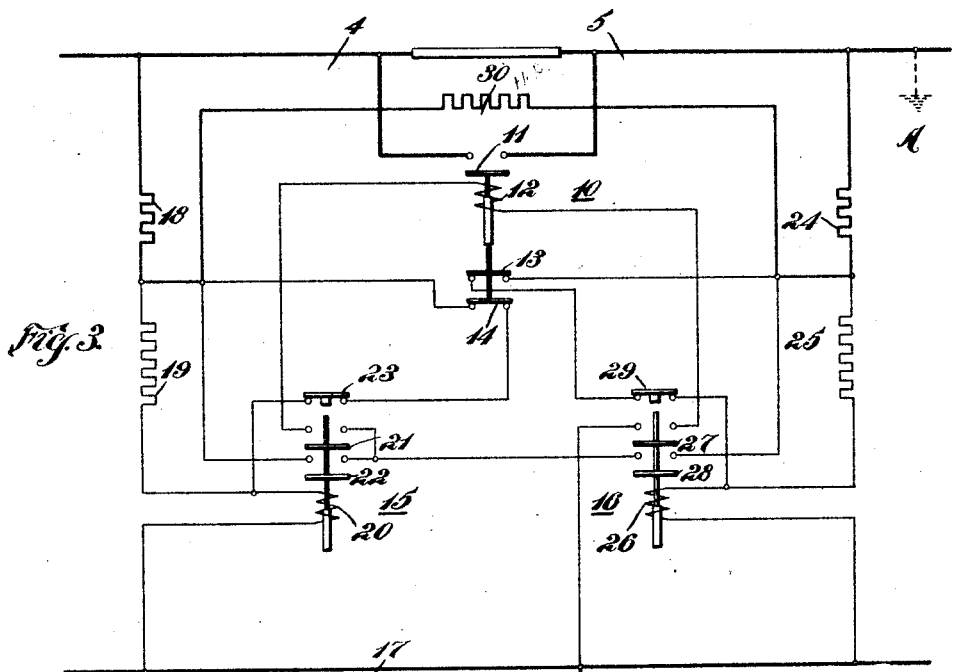
WITNESSES:
INVENTOR
Maurice E. Reagan
BY
Wesley G. Carr
ATTORNEY Patented Dec. 14, 1926.

1,610,590

UNITED STATES PATENT OFFICE.

MAURICE E. REAGAN, OF PITTSBURGH, PENNSYLVANIA, ASSIGNOR TO WESTINGHOUSE ELECTRIC & MANUFACTURING COMPANY, A CORPORATION OF PENNSYLVANIA.

AUTOMATIC CIRCUIT INTERRUPTER.

Application filed March 24, 1921. Serial No. 454,994.

My invention relates to automatic reclosing circuit interrupters and particularly to interrupters of the type known, and employed, as sectionalizing switches.

One object of my invention is to provide means for disconnecting a faulty section of a circuit embodying a plurality of sections connected to a source of energy.

Another object of my invention is to provide means, in a system of the above-indicated character, that shall operate to selectively disconnect a faulty section of the circuit in accordance with the potential gradient that is developed, upon the occurrence of a fault, between the source of energy and the fault.

Another object of my invention is to provide a system, of the above-indicated character, in which only the interrupters at the respective ends of the faulty section shall be opened, and the other interrupters are permitted to remain closed.

A further object of my invention is to provide a system, of the above-indicated character, in whch the faulty section shall be immediately reconnected to the circuit upon the clearance of the fault.

In practicing my invention, I provide two potential relays for each sectionalizing switch, one relay being connected across the circuit on each side of the sectionalizing switch. The closing mechanism of the sectionalizing switch is controlled by these two relays and its energization is dependent upon the energization of the potential relays to a predetermined degree sufficient to operate the same.

Upon the occurrence of a fault, the potential available for energizing one of the potential relays decreases below a predetermined value that is sufficient to maintain that relay in its operative position. The main switch is thereupon permitted to open and a resistor of relatively high resistance is inserted between the source of energy and the fault. When the ratio of the resistance of the fault and the resistance of the resistor, that is connected across the terminals of the sectionalizing switch, attains a predetermined value, the potential gradient between the source of energy and the fault becomes so changed that sufficient voltage is impressed across the potential relay, that has meanwhile been actuated to its inoperative position, to re-actuate it to its operative position. The sectionalizing switch is thereupon reclosed to reconnect the section to the circuit.

Figure 1 of the accompanying drawings is a diagrammatic view of a trolley feeder conductor circuit, illustrating the division thereof into a plurality of sections;

Fig. 2 is a schematic view illustrating the potential gradients developed between the fault and sources of energy in the system described in Fig. 1; and Fig. 3 is a diagrammatic view of a sectionalizing switch illustrating the connection of the elements thereof.

A plurality of feeder conductor sections 4, 5 and 6 are supplied with energy from two sources of electromotive force 7 and 8. The feeder conductor sections are adapted to supply energy to corresponding sections of a trolley conductor 9 through a plurality of connecting conductors. The feeder conductor sections are connected by means of sectionalizing switches 10.

Each sectionalizing switch 10 comprises a main switch 11, an operating coil 12 and two auxiliary switches 13 and 14 that are closed when the main switch 11 is open. Two relays 15 and 16 are provided to control the circuit of the operating coil 12.

The relay 15 is connected between the section 4 and the return rail 17 through a resistor 18 of relatively low resistance and a resistor 19 of relatively high resistance. The relay 15 comprises an operating coil 20, two main switches 21 and 22 that are open when the relay is de-energized, an auxiliary switch 23 that is closed while the relay is de-energized, and opened just after the other switches 21 and 22 have closed.

The relay 16 is similarly connected between the section 5 and the rail 17 through a resistor 24 of relatively low resistance and the resistor 25 of relatively high resistance. The relay 16 comprises an operating coil 26 and two switches 27 and 28 that are open, when the relay is de-energized, and an auxiliary switch 29 that is closed, when the relay is deenergized, and opened, when the relay is energized, immediately after the closing of the switches 27 and 28.

A resistor 30 of relatively high resistance is connected between the feeder conductor sections 4 and 5 in series with resistors 18 and 24 to prevent an exchange of current of relatively large value between the sections 4 and 5 upon the occurrence of a fault in either section.

Assuming a normal operating voltage of 600 volts, the relays 15 and 16 would be adjusted to operate, for example, at a potential of 200 volts. If conditions are normal throughout the system, normal potential will be impressed upon the operating coil 20 of the relay 15 from the feeder conductor 4 through the resistor 18, the switch 14, and the switch 23 through the operating coil 20 to the rail 17. It will be observed that the auxiliary switches 14 and 23 close-circuit the resistor 19 while the switches 10 and 15 are in their de-energized positions. The relay 15 is thereupon sufficiently energized to operate.

Upon the operation of the relay 15, after the engagement of the switches 21 and 22 controlled thereby, the auxiliary switch 23 is opened. The design and construction of the relays 15 and 16 are such that a lower value of current suffices to maintain the relays in their energized position than is required to actuate them to that position. Thus, after the operation of the relay 15, the opening of the switch 23 permits the insertion of the resistor 19 into the circuit of the operating coil 20.

Assuming conditions on the section conductor 5 also to be normal, the relay 16 is similarly actuated to its energized position to close the switches 27 and 28 and to open the switch 29.

Both relays 15 and 16 being in their energized positions, the operating coil 12 of the switch 10 becomes energized through the switches 21, 22 and 28 of the relays 15 and 16, to close the main switch 11 and to open the auxiliary switches 13 and 14. The switch 11 will now remain closed so long as both the relays 15 and 16 remain in their energized positions.

Upon the occurrence of a fault in a portion of the system connected to the section conductor 5, the potential gradient of the system becomes such as is illustrated in Fig. 2 and the voltage available for energizing the potential relays associated with the sectionalizing switches on either end of the section 5 becomes less than the value of the voltage required to maintain the relays in their operative positions.

Referring to the sectionalizing switch 10 that is connected between the sections 4 and 5, it will be observed that, upon the occurrence of a fault, as indicated at the point A of the section conductor 5, the potential difference available between the conductor 5 and the rail 17 is less than the predetermined voltage of 200 volts that is necessary to maintain the relay 16 in its energized position. The relay 16, therefore, permits its switches 27 and 28 to open and the auxiliary switch 29 to close.

The opening of the switch 28 opens the circuit of the operating coil 12 of the switch 10, whereupon the main switch 11 is opened. The opening of the switch 11 permits the resistor 30 to become effective between the sections 4 and 5 to limit the value of current that may traverse those sections to the fault at the point A. Since the voltage of the section conductor 4 is still normal, the relay 15 remains in its energized position.

As the resistance of the fault at the point A increases, the potential gradient changes in accordance with the dotted curve in Fig. 2 and the relay 16 comes within a zone of the potential gradient that provides a potential difference which is sufficient to energize the relay to effect the reclosing of the switches 27 and 28. When the resistance of the fault at A so increases that the ratio between the resistance of the fault and the resistance of the resistor 30 attains a predetermined value, the relay 16 becomes sufficiently energized to be actuated to its operative position. That is, when the resistance of the fault so increases that the voltage of the circuit is distributed between the resistor 30 and the resistance of the fault in a predetermined ratio, the relay 16 will reclose.

The reclosing of the switches 27 and 28 again completes the energizing circuit of the operating coil 12 of the sectionalizing switch 10 and the main switch 11 is reclosed to reconnect the sections 4 and 5.

It will thus be observed that the operation of the system embodying my invention is dependent upon the potential gradient that is produced upon the occurrence of a fault between the fault and the source of energy, and that the selective operation of the relays in accordance with the potential gradient permits the disconnection of only the faulty section.

My invention is not limited to the specific elements that are illustrated nor to the specific arrangements of those elements, since modifications may be made therein within the spirit and scope of the invention, as set forth in the appended claims.

I claim as my invention:—

1. An electric circuit sectionalizing system comprising two circuit sections and a common return conductor, a circuit interrupter connected between the circuit sections, a resistor connected in parallel relation to the circuit interrupter for limiting the traversal of current between the circuit sections when the circuit interrupter is open, two relay devices respectively connected between two intermediate points of the current-limiting resistor and the common return conductor, and cooperating means controlled by the relay devices for rendering the portion of the current-limiting resistor between said intermediate points ineffective and for controlling the operation of the circuit interrupter.

2. An electric circuit sectionalizing system comprising two circuit sections and a common return conductor, a circuit interrupter connected between the circuit sections, a resistor connected in parallel relation to the circuit interrupter for limiting the traversal of current between the circuit sections when the circuit interrupter is open, two relay devices respectively connected between two intermediate points of the current-limiting resistor and the common return conductor, a resistor connected in series with each of the relay devices, and a circuit cooperatively controlled by the circuit interrupter and the associated relay device for controlling the effectiveness of each of said series-connected resistors.

3. An electric circuit sectionalizing system comprising two circuit sections and a common return conductor, a circuit interrupter connected between the circuit sections, a resistor connected in parallel relation to the circuit interrupter for limiting the traversal of current between the circuit sections when the circuit interrupter is open, two relay devices respectively connected between two intermediate points of the current-limiting resistor and the common return conductor, a resistor connected in series with each of the relay devices, and a circuit connected in parallel relation to each of said series-connected resistors and comprising an auxiliary switch actuated by the circuit interrupter and a switch actuated by the associated relay device whereby each of said series-connected resistors is short-circuited when the circuit interrupter is open and the associated relay device is energized below a predetermined degree.

In testimony whereof, I have hereunto subscribed my name this 18th day of March 1921.

MAURICE E. REAGAN.